Sept. 9, 1969    H. KOMENDOWSKI ET AL    3,465,628
HINGE TYPE HORIZONTAL BAND SAW
WITH IMPROVED CONTROL SYSTEM
Filed Sept. 19, 1966                          3 Sheets-Sheet 1
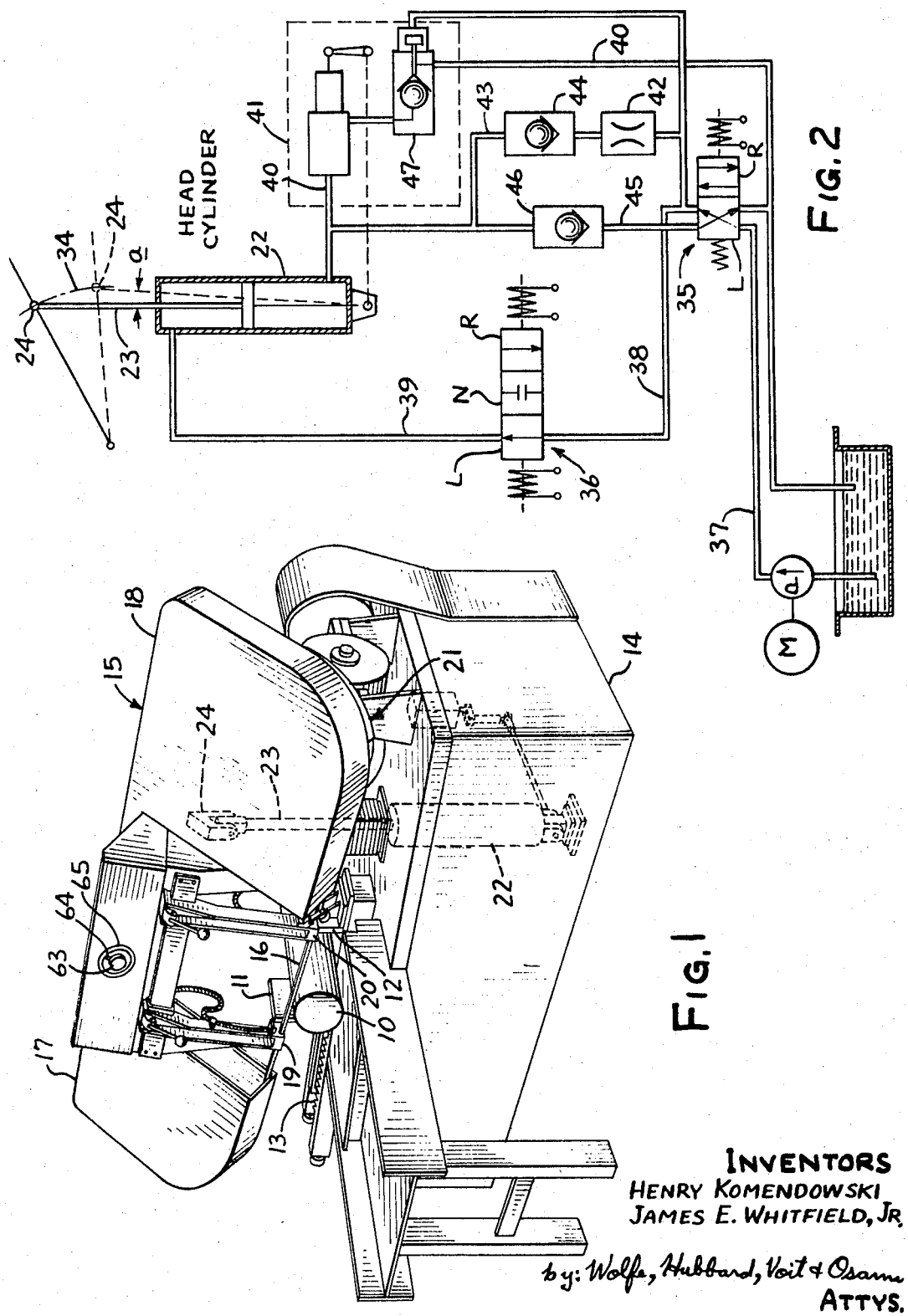
INVENTORS
HENRY KOMENDOWSKI
JAMES E. WHITFIELD, JR.
by: Wolfe, Hubbard, Voit & Osann
ATTYS.

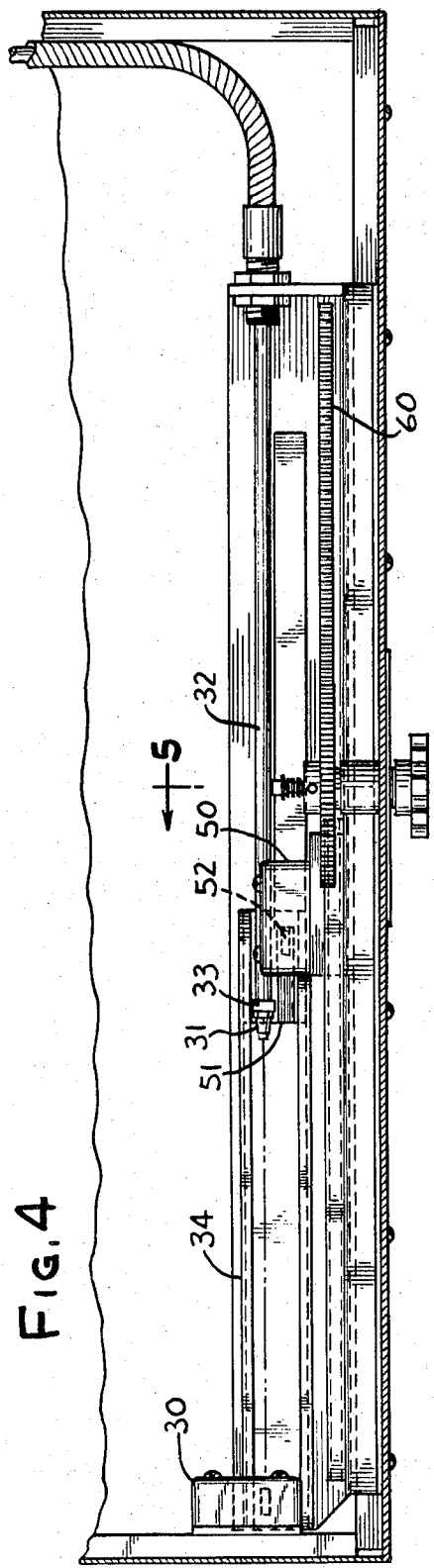
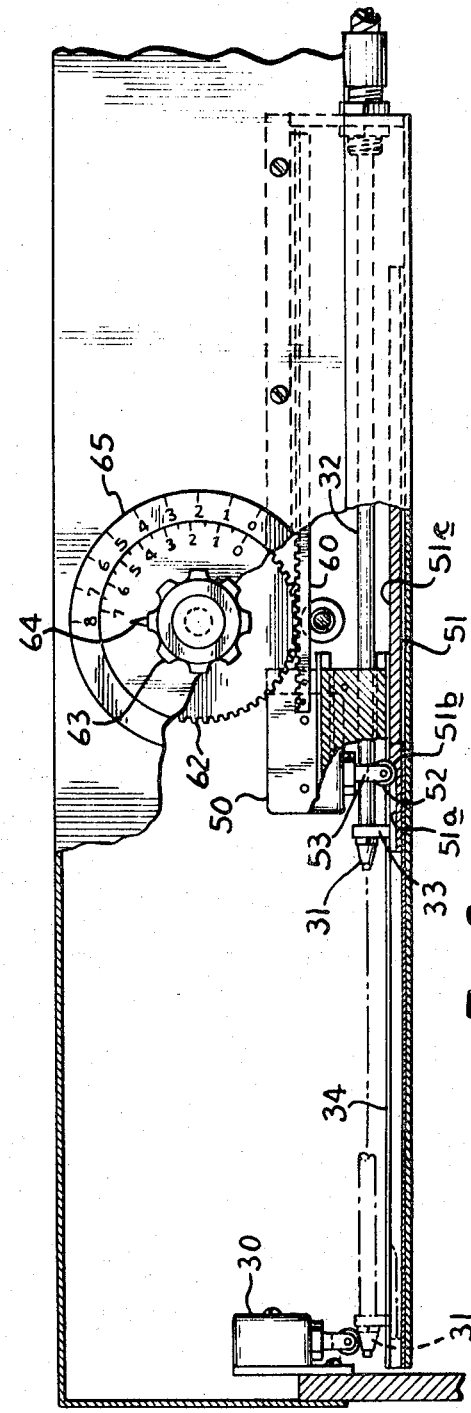
FIG. 4
FIG. 3
INVENTORS
HENRY KOMENDOWSKI
JAMES E. WHITFIELD, JR.
by: Wolfe, Hubbard, Voit & Osann
ATTYS.

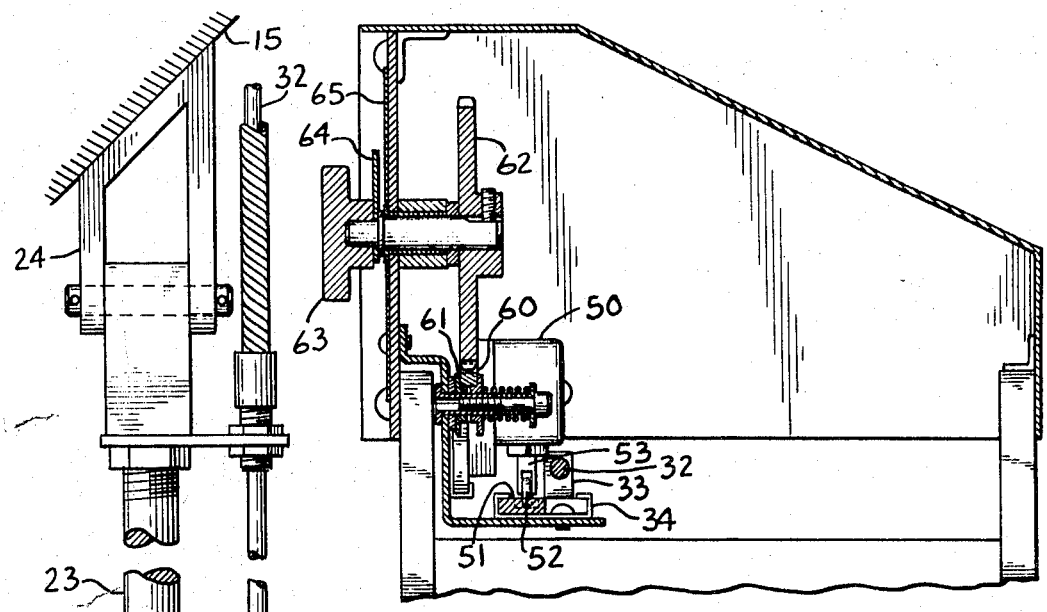
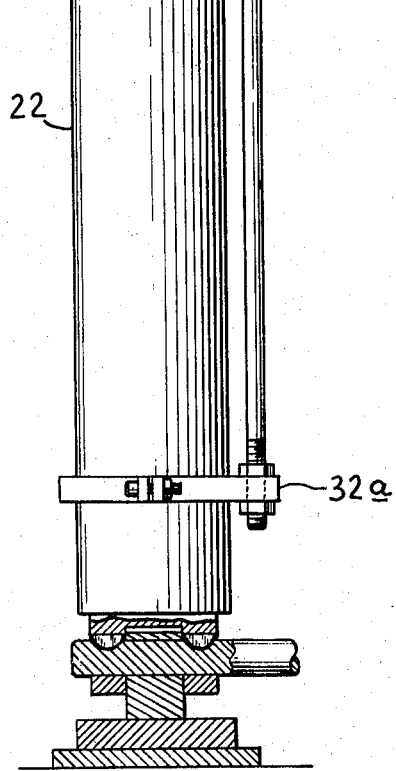
Fig. 5
Fig. 6
INVENTORS
HENRY KOMENDOWSKI
JAMES E. WHITFIELD, JR.
by: Wolfe, Hubbard, Voit & Osann
ATTYS.

United States Patent Office 3,465,628
Patented Sept. 9, 1969

3,465,628
HINGE TYPE HORIZONTAL BAND SAW WITH IMPROVED CONTROL SYSTEM
Henry Komendowski and James E. Whitfield, Jr., Chicago, Ill., assignors to Armstrong-Blum Manufacturing Company, Chicago, Ill., a corporation of Illinois
Filed Sept. 19, 1966, Ser. No. 580,414
Int. Cl. B26d 1/46, 5/12
U.S. Cl. 83—201.07          3 Claims

ABSTRACT OF THE DISCLOSURE

A hinge-type horizontal band saw having a hydraulic drive means to raise and lower the saw head. Automatic means are provided to control the extent to which the saw head will be moved.

---

The present invention relates generally to horizontal band saws and, more particularly, to a hinge-type horizontal band saw having an improved control system for controlling the raising and lowering of the saw head.

It is a primary object of this invention to provide an improved hinge-type horizontal band saw having an improved control system for controlling the raising and lowering of the saw head in accordance with the height of the workpiece. A more particular object of the invention is to provide such a band saw in which the control system is extremely accurate and is not subject to operating errors due to vibration.

It is another object of the present invention to provide an improved horizontal band saw of the foregoing type in which the control system is positive acting in both directions. A related object is to provide such a band saw which is reliable over long operating periods, and requires a minimum of maintenance. In this connection, still another object is to provide an improved control system of the type described above which reduces the down time of the band saw.

A further object of this invention is to provide a hinge-type horizontal band saw having a control system with the features described above, and which permits adjustment of the retracted position of the saw head in order to reduce the time period for each cutting cycle in a repetitive cutting operation.

Other objects and advantages of the invention will become apparent from the following description and upon reference to the accompanying drawings, in which:

FIGURE 1 is a perspective view of a horizontal hinge-type band saw embodying the present invention;

FIG. 2 is a schematic diagram of the hydraulic circuit associated with the hydraulic cylinder for raising and lowering the saw head in the machine of FIG. 1;

FIG. 3 is an enlarged side elevation, partially in section, of the control mechanism for controlling the advanced and retracted positions of the saw head in the machine of FIG. 1;

FIG. 4 is an enlarged top plan of the control mechanism shown in FIG. 3;

FIG. 5 is a section taken along line 5—5 in FIG. 4; and

FIG. 6 is an enlarged elevation of the hydraulic head cylinder and a portion of the control mechanism not shown in FIGS. 4 and 5.

While the invention is described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

Turning now to the drawings, and referring first to FIGURE 1, there is shown a hydraulic, hinge-type, horizontal band saw for making repetitive high speed cuts through an elongated workpiece 10. The workpiece is fed in to the band saw along a horizontal table by means of a conventional feeding mechanism such as a feed shuttle. During the cutting operation, the workpiece is held firmly in position by means of a hydraulically operated vise including a pair of opposed jaws 11 and 12. Hydraulic clamping pressure is applied to the left-hand jaw 11, as viewed in FIGURE 1, through a ratchet 13 powered by an integral hydraulic cylinder. If desired, a screw adjustment may be provided on the piston rod associated with the hydraulic cylinder for permitting reduction of clamping pressure to prevent distortion of light gauge workpieces.

The workpiece table and feed mechanism of the illustrative band saw are mounted on a supporting frame or base member 14, which also supports one end of the saw head 15. The saw head 15 includes a conventional pair of horizontally spaced band wheels carrying a continuous band saw blade with an exposed length 16 of the blade being disposed directly over the work table. A head frame carries the two band wheels for rotation inside two spaced housing sections 17 and 18, with the right-hand wheel, inside the housing section 18, being driven by a suitable motor. For the purpose of guiding the exposed length 16 of the band saw blade, a pair of similar guide members 19, 20 depend from the head frame and fit over the blade 16 on opposite sides of the workpiece. These guide members 19, 20, which also provide backup support for the blade 16, are preferably of the type described in U.S. Patent No. 2,914,101, "Saw Blade Backstop," so as to provide accurate guidance along with a long operating life.

In order to permit the saw head 15 to be raised and lowered with respect to the work table, for cutting the workpiece, one end of the head is hinged to the base member 14, as at 21 in FIGURE 1. The raising and lowering of the head is effected by a hydraulic cylinder 22 anchored to the machine base 14, this cylinder also serving as a support for the saw head. Hydraulic pressure within the cylinder 22 controls the operation of a piston rod 23 which extends upwardly from the cylinder 22 and is pivotally secured at its upper end to the head frame by a bracket 24. Consequently, as the piston rod 23 is advanced upwardly, it tilts the saw head 15 upwardly about its hinged connection to the base 14, so that the band saw blade 16 is moved upwardly, i.e., retracted from the work table. Conversely, when the piston rod 23 is retracted, the head 15 is lowered or advanced toward the work table.

For the purpose of controlling the upward and downward movement of the saw head, an automatic control system is associated with the saw head 15 and initiates the upward movement of the head to retract the saw blade from the cut workpiece. The control system also responds to the upward movement of the saw head to a preselected retracted position to stop the upward movement of the head. By selecting the retracted position according to the height of the workpiece, the retracting movement of the saw can be stopped just after the blade clears the workpiece so that there is practically no waste motion between cuts. This insures maximum overall cutting speed by minimizing the time period required for each individual cutting cycle.

In accordance with the present invention, the control system associated with the saw head includes a depth control switch and a height control switch and cam means associated with each switch for operating the same, each switch and its associated cam being responsive to the upward and downward movement of the saw head for providing positive movement of the switch and associated cam relative to each other, as a function of the upward and downward movement of the head, so as to control the movement of the head between preselected advanced and retracted positions. Thus, referring particularly to FIGS. 3–5, the illustrative control system includes a depth control switch limit 30 at a fixed position on the saw head 15, and an associated operating cam 31 fixed to a flexible rod 32 anchored to the head actuating cylinder 22 by means of a conventional mounting bracket 32a. Consequently, the switch 30 and cam 31 are moved positively relative to each other in response to advancing and retracting movement of the saw head, the switch 30 being advanced toward the cam 31 as the saw head is advanced or lowered, and retracted away from the cam as the head is retracted or raised.

In order to guide the switch 30 and cam 31 toward each other, the cam 31 is secured to a guide block 33 mounted for sliding movement in a longitudinal track member 34 secured to the saw head. Since the cam 31 is effectively fixed to the stationary hydraulic cylinder 22 by the rod 32 (although the cam is free to ride on the tilting saw head due to the flexibility of the rod 32), while the switch 30 is fixed to the movable saw head, downward movement of the saw head causes the switch 30 and cam 31 to advance toward each other along the track 34. At a preselected advanced position of the saw head, the cam 31 engages the switch 30 so as to activate a solenoid-operated valve to reverse the movement of the saw head. More particularly, the depth control switch is operatively connected to the solenoids of a pair of valves 35 and 36 (FIG. 2) which control the flow of hydraulic fluid to the head activating cylinder 22. When the head is being lowered, the two valves 35, 36 are in the positions designated L in FIG. 2 so that hydraulic fluid is pumped from a feed line 37 through valve 35 to a line 38, and therefrom through valve 36 to a line 39 which conducts the fluid into the cylinder 22 so as to retract the piston to lower the saw head. Fluid discharged from the lower end of the cylinder 22 as the piston is retracted is returned through a line 40 which includes a compensating means 41 of the type described in copending application Ser. No. 580,262, "Feed Pressure Control System for Hinge Type Horizontal Band Saw," filed concurrently herewith and assigned to a common assignee. A fixed flow control valve 42 feeds an extra supply of hydraulic fluid from the pressure line 38 through a line 43 to the compensator 41 during feeding movement of the saw to insure a continuous flow of fluid through the compensator. Return flow of hydraulic fluid through the line 43 is prevented by a check valve 44 connected in series with the valve 42.

As the saw head reaches the preselected advanced position where the cam 31 engages the depth control switch 30, the switch energizes solenoids associated with the two valves 35, 36 to switch the valves to the positions designated R in FIG. 2 so as to reverse the flow of hydraulic fluid to the actuating cylinder 22, thereby stopping the feeding movement of the saw head and starting retracting or upward movement thereof by advancing the piston. More particularly, when the valves 35, 36 are in the R positions, hydraulic fluid from the feed line 37 is pumped through line 45 to advance the cylinder piston, and the discharged fluid is returned through the line 39 and valve 36 to tank. A check valve 46 in the hydraulic line 45 functions to bypass the hydraulic line 40 whenever the head is being raised, so that the compensator 41 is hydraulically operative only during the feeding movement of the head. That is, the check valve 46 opens the line 45 when the valves 35, 36 are in the R positions, and then closes the line 45 when the valves are in the L positions to direct the hydraulic fluid through line 40 and the compensating means associated therewith. An additional check valve 47 assoicated with the compensator 41 also closes the line 40 so that fluid passed by the valve 37 to raise the head is directed into the head cylinder 22 rather than being returned through the compensator.

While the depth control switch 30 and cam 31 are fixed relative to each other when the saw head is not moving in the illustrative machine, thereby providing a fixed saw cut depth, it will be appreciated that a variable depth control may be provided with this arrangement by making either the switch or cam adjustable. For example, the depth control switch 30 could be mounted on an adjustable gear and rack assembly as described below for the height control switch. Moreover, the relative positions of the switch and cam may be reversed without affecting the overall operation of the control system.

Turning next to the height selector portion of the illustrative control system, a height control limit switch 50 mounted on the saw head cooperates with an associated cam bar 51 to stop the upward movement of the saw head at a preselected retracted position. As in the case of the depth control cam 31 described above, the height control cam 51 is mounted on the track 34 to permit sliding movement between the saw head 15 and cam 51, and the cam is connected to the flexible rod 32 so that it is effectively secured to a stationary member while riding on the tiltable saw head. Consequently, the switch 50 and cam 51 are moved positively relative to each other in response to advancing and retracting movement of the saw head, the cam 51 sliding under the switch 50 so that a cam follower 52 on the switch actuator 53 rides on cam surfaces 51a, 51b, and 51c defined by the upper surface of the cam bar 51.

While the saw head is being lowered and raised, the cam follower 52 rides on the uppermost cam surface 51c so as to maintain the switch 50 in the position corresponding to positions R of the valves 35, 36. As the head is raised to the point where the upward movement is to be stopped, the cam follower 52 rides down the ramp 51b onto the lower cam surface 51a, thereby actuating the switch 50 to switch the two valves 35 and 36 to the R positions. This reverses the flow of hydraulic fluid to the actuating cylinder 22 so that the upward movement of the saw head is automatically reversed to start the downward movement of the head for the next cutting cycle. Of course, conventional manual controls may be provided to stop the repetitive automatic cutting operation at any time, such as by switching the valve 36 to its neutral or off position N.

In accordance with one particular aspect of this invention, the preselected retracted position at which the upward movement of the cutting head is stopped may be adjusted by adjusting the position of the height control switch 50 relative to the cam member 51. More particularly, the limit switch 50 and its actuator 53 are mounted on the cutting head by means of a movable rack 60 slidably mounted in a stationary channel or track 61 secured to the head frame. The transverse position of the rack 60, and thus the limit switch 50, is controlled by means of a gear wheel 62 which in turn is controlled by a manual control knob 63. The knob is provided with a pointer 64 cooperating with a calibrated dial 65 for the purpose of correlating the angular movement of the knob 63 with the corresponding retracted position of the cutting head 15. For example, if the knob 63 is turned until the pointer 64 registers with the numeral 1 on the dial 65, the cutting head 15 will be retracted until it is one inch above the surface supporting the workpiece 10, and then automatically reversed. Consequently, it can be seen that the retracted position of the cutting head can be set to correspond to the height of the workpiece 10, so that the retracting movement of the head is stopped at a height just sufficient to permit advancing movement of the workpiece for the next cut. Thus, by making an appropriate setting on the dial 65, lost motion of the cutting head between repetitive cuts can be eliminated, thereby minimizing the time period for each individual cutting cycle.

It will be recognized that the relative positions of the height control elements 50, 51 could be reversed so that the position of the cam member would be adjustable rather than the position of the limit switch 50. Also, it would be possible to have the limit switch 50 secured to the cutting head 15 at a fixed location, with means being provided for adjusting the position of varying the relative positions of the switch 50 and the cam 51.

As can be seen from the foregoing detailed description, the improved height and depth control system provided by this invention provides a positive cam type control of the raising and lowering of the saw head so that it is not subject to operating errors due to vibrations. The control system may be adjustable to stop the raising and lowering movement of the saw head in accordance with the height of the workpiece and the desired cutting depth, thereby permitting automatic repetitive cutting operating with a minimum time period for each cutting cycle. In oher words, the horizontal band saw can be operated at maximum speed, in an automatic repetitive cutting mode, with a high degree of reliability over long operating periods. The horizontal band saw incorporating the inventive control system requires a minimum of maintenance with attendant reductions in operating costs and machine down time.

We claim as our invention:

1. In a horizontal band saw, the combination comprising a fixed base member including means for receiving and holding a workpiece to be cut, a saw head disposed above said base member and including a pair of spaced band wheels carrying a continuous band saw blade, said saw head being hinged at one end to said fixed base member to permit upward and downward tilting movement of the head relative to the workpiece, hydraulically operated actuating means associated with said saw head for tilting the same upwardly and downwardly about its hinged connection to said base member, and control means associated with said saw head and said actuating means including a solenoid-operated hydraulic valve for controlling the operation of said actuating means to control the upward and downward movement of the head, said control means including a depth control switch and associated cam means for operating said switch, means responsive to downward movement of the saw head for providing positive movement of said depth control switch and associated cam relative to each other as a function of the downward movement of the head so that said switch is operated by said cam at a preselected advanced position of the depth control head for actuating said valve to stop the downward movement and start the upward movement of the head, a height control switch and associated cam means for operating said switch, means operatively connected between said saw head and a fixed point on said base member or actuating means and responsive to upward movement of the saw head for providing positive movement of said height control switch and associated cam relative to each other as a function of the upward movement of the head so that said height control switch is operated by said cam at a preselected retracted position of the head for actuating said valve to stop the upward movement and automatically start the downward movement of the head for repetitive cutting operations of the head, rack and gear means connected to said height control switch or said cam associated therewith for adjusting the position of said height control switch and associated cam relative to each other to vary said preselected retracted position of the saw head and manual adjusting means mounted on the exterior of said saw head and connected to said rack and gear means for selecting the desired preselected retracted position of said saw head, said adjusting means having a calibrated dial associated therewith to correlate the position of said adjusting means with the corresponding retracted position of the saw head.

2. A horizonal band saw as defined in claim 1 which includes means for adjusting the relative positions of said depth control switch and said associated cam means to actuate said depth control switch at variable preselected advanced positions of the saw head according to the depth of the desired cut.

3. In a horizontal band saw, the combination comprising a fixed base member including means for receiving and holding a workpiece to be cut, a saw head disposed above said base member and including a pair of spaced band wheels carrying a continuous band saw blade, said saw head being hinged at one end to said fixed base member to permit upward and downward tilting movement of the head relative to the workpiece, a hydraulically operated actuating means connected to the saw head for tilting the head upwardly and downwardly about its hinged connection to the base member, a solenoid-operated hydraulic valve operatively connected to said actuating means for controlling the operation thereof, first and second cam-controlled limit switches mounted on the saw head and connected in circuit with the solenoid associated with said valve for controlling the operation thereof, a depth control cam mounted on the saw head for cooperation with the first cam-controlled limit switch, means operatively connected between said saw head and a fixed point on said base member or actuating means for positively advancing said depth control cam and said first limit switch relatively toward each other during downward movement of the saw head and retracting them relatively away from each other during upward movement of the head, said depth control cam and said first limit switch being adapted to actuate the switch at a preselected advanced position of the saw head for stopping downward movement of the head and starting upward movement thereof, a height control cam mounted on the saw head for cooperation with the second cam-controlled limit switch, means operatively connected between said saw head and a fixed point on said base member or actuating means for positively advancing said height control cam and said second limit switch relatively toward each other during upward movement of the saw head and retracting them away from each other during downward movement of the head, rack and gear means connected to said height control switch or said cam associated therewith for adjusting the relative positions of said height control cam and said second limit switch to actuate the switch at variable preselected retracted positions of the saw head for stopping upward movement of the head at a position selected according to the height of the workpiece and automatically starting the downward movement of the saw head for repetitive cutting operations, and manual adjusting means mounted on the exterior of said saw head and connected to said rack and gear means for selecting the desired preselected retracted position of said saw head, said adjusting means having a calibrated dial associated therewith to correlate the position of said adjusting means with the corresponding retracted position of the saw head.

References Cited

UNITED STATES PATENTS

| | | | |
|---|---|---|---|
| 2,594,548 | 4/1952 | Flick | 83—201 |
| 2,602,987 | 7/1952 | Wells | 83—201.06 X |
| 2,612,951 | 10/1952 | Palmleaf | 83—639 X |

FRANK T. YOST, Primary Examiner

U.S. Cl. X.R.

83—530, 639, 647.5; 143—19